United States Patent
Lohr

(10) Patent No.: US 7,336,048 B2
(45) Date of Patent: Feb. 26, 2008

(54) METHOD FOR OPERATING A POWER TOOL

(75) Inventor: Guenter Lohr, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/416,149

(22) Filed: May 2, 2006

(65) Prior Publication Data
US 2006/0245135 A1 Nov. 2, 2006

(30) Foreign Application Priority Data
May 2, 2005 (DE) ................ 10 2005 020 377

(51) Int. Cl.
*B23Q 5/00* (2006.01)
*H02H 7/08* (2006.01)
(52) U.S. Cl. ............... 318/434; 318/471; 318/479; 320/134; 361/24; 173/181; 173/217
(58) Field of Classification Search ........ 318/430–434, 318/471; 173/7, 181, 217; 320/114, 127, 320/134; 340/635, 636.1, 636.12; 361/23, 361/24, 25, 33
See application file for complete search history.

(56) References Cited

U.S. PATENT DOCUMENTS

| | | | | |
|---|---|---|---|---|
| 4,430,681 A | * | 2/1984 | Benzing | 361/27 |
| 4,719,395 A | * | 1/1988 | Aoi et al. | 388/840 |
| 4,851,743 A | | 7/1989 | Schmerda et al. | |
| 5,410,229 A | | 4/1995 | Sebastian et al. | |
| 5,731,673 A | * | 3/1998 | Gilmore | 318/432 |
| 6,172,860 B1 | * | 1/2001 | Yoshimizu et al. | 361/25 |
| 6,286,609 B1 | * | 9/2001 | Carrier et al. | 173/1 |
| 6,566,843 B2 | * | 5/2003 | Takano et al. | 320/114 |
| 6,741,051 B2 | * | 5/2004 | Chu | 318/376 |
| 7,062,979 B2 | * | 6/2006 | Day et al. | 73/862.22 |
| 2004/0179829 A1 | | 9/2004 | Phillips et al. | |

FOREIGN PATENT DOCUMENTS

| | | |
|---|---|---|
| JP | 2005001039 | 1/2005 |
| JP | 2005006384 | 1/2005 |

* cited by examiner

*Primary Examiner*—Bentsu Ro
(74) *Attorney, Agent, or Firm*—Michael J. Striker

(57) ABSTRACT

In a method for operating a power tool with an energy accumulator, in particular a rechargeable energy accumulator, which supplies power to an electric drive motor, a clock frequency is generated by an electronic unit, with which a gate of a MOSFET—which supplies operating voltage to the drive motor—is switched on with each cycle, and a switching-off of the MOSFET is carried out within one cycle using different signals, as a function of operating parameters.

10 Claims, 2 Drawing Sheets

METHOD FOR OPERATING A POWER TOOL

CROSS-REFERENCE TO A RELATED APPLIACTION

The invention described and claimed hereinbelow is also described in German Patent Application DE 102005020377.9 filed on May 2, 2005. This German Patent Application, whose subject matter is incorporated here by reference, provides the basis for a claim of priority of invention under 35 U.S.C. 119(a)-(d).

BACKGROUND OF THE INVENTION

The present invention is directed to a method for operating a power tool.

When rechargeable energy accumulators are used with power tools, total discharge of the energy accumulator must be avoided, since this can cause the energy accumulator to become irreversibly damaged, or, at the least, its service life can be greatly reduced.

SUMMARY OF THE INVENTION

Accordingly, it is an object of the present invention to provide a method for operating a power tool, which is a further improvement of the existing methods.

The method according to the present invention for operating a power tool with an energy accumulator is suited for use, in particular, with power tools with lithium ion batteries.

The energy accumulator is successfully protected, and good regulating properties for the power tool are attained. A clock frequency is generated by an electronic unit, with which a gate of a MOSFET, which supplies operating voltage to the drive motor, is switched on with each cycle, it being possible to switch off the MOSFET within one cycle using different signals, as a function of operating parameters. When the MOSFET is switched off, the first result is not that the drive motor is shut off, but rather that a pulse width of the drive motor is reduced. The motor current and, therefore, the torque remain high or even at a maximum level, and only the rotational speed decreases.

Preferably, when a specified threshold value of an operating parameter of the power tool is reached, a pulse width of triggering signals of the drive motor is reduced. The power tool merely reduces the pulse width, but does not shut off completely.

In a favorable embodiment, when a maximum permissible threshold of an electric current from the energy accumulator is reached, the pulse width is reduced.

In a further favorable embodiment, when a maximum permissible power loss of the energy accumulator and/or the drive motor is reached, the pulse width is reduced. Resetting the gates does not result in the power tool being switched off. Instead, it only results in a reduction in the rotational speed. Advantageously, the power loss is determined by determining a signal in proportion to ohmic losses in the energy accumulator and/or the drive motor, and a power loss that is above permissible losses is integrated. To determine the power loss, the current from the energy accumulator can be determined based on a current-proportional signal and converted to a signal that is proportional to the square of the current, a difference between the current value and the current threshold can be calculated, and the difference can be integrated with respect to time. The power loss that is above the permissible losses is therefore integrated.

In a favorable embodiment, when a maximum permissible temperature of the energy accumulator is reached, a measured current signal is modified such that the drive motor is gently turned off. By intentionally and specifically adulterating the current signals, an uncomfortable, abrupt shut-off can be prevented.

In a favorable embodiment, when a permissible minimum electrical voltage of the energy accumulator is fallen below, the gate is shut off. Preferably, the drive motor is not shut off completely until the energy accumulator is discharged.

In a favorable embodiment, drilling-site illumination of the power tool is not switched off until the drive motor is shut off completely. The power tool operator can continue working nearly interference-free even when threshold values are exceeded or fallen below, while the energy accumulator is reliably protected against harmful total discharge.

It is advantageously provided that the pulse width of the gate voltage is adjusted in an on-off switch of the power tool using a potentiometer. Using a logarithmic curve of the pulse width as a function of a displacement path of the on-off switch, the rotational speed of the power tool can be adjusted very precisely between 0 and 100%.

Further embodiments, aspects and advantages of the present invention also result independently of their wording in the claims, without limitation to generality, from an exemplary embodiment of the present invention presented below with reference to the drawing.

DESCRIPTION OF THE PREFERRED EMBODIMENTS

Figure 1:
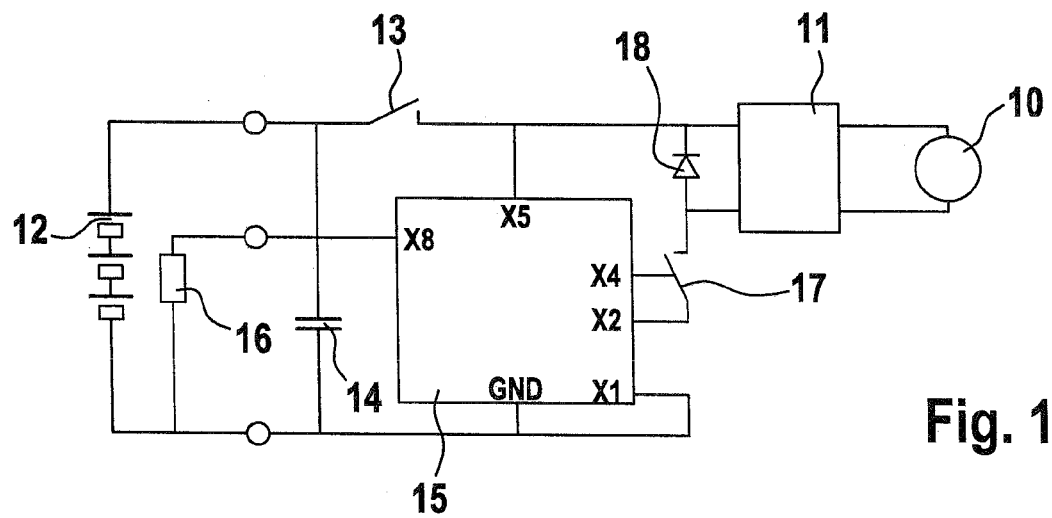
FIG. 1 shows a schematic diagram of a preferred power tool in accordance with the present invention.
Figure 2:
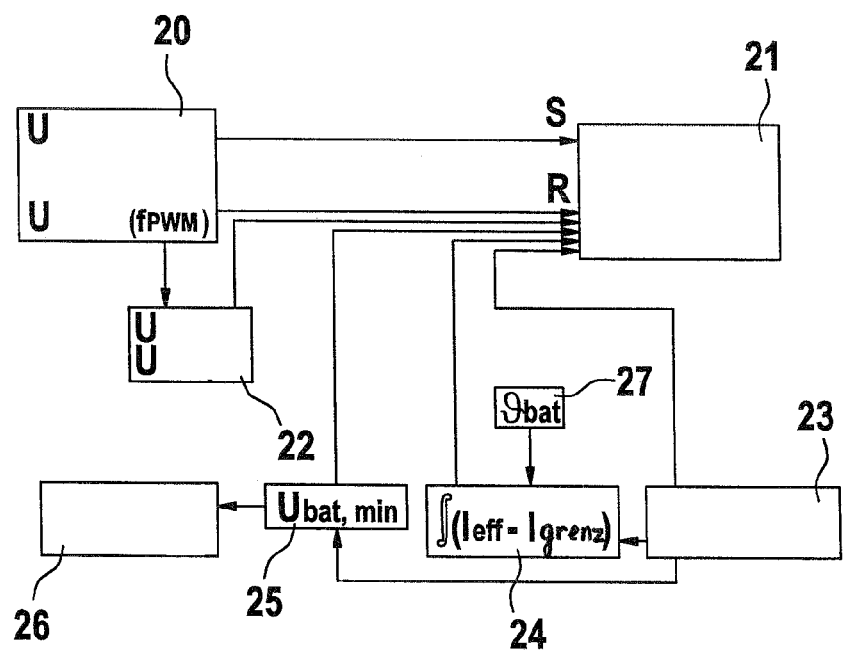
FIG. 2 shows a sequence of functions of a preferred method in accordance with the present invention.
Figure 3:
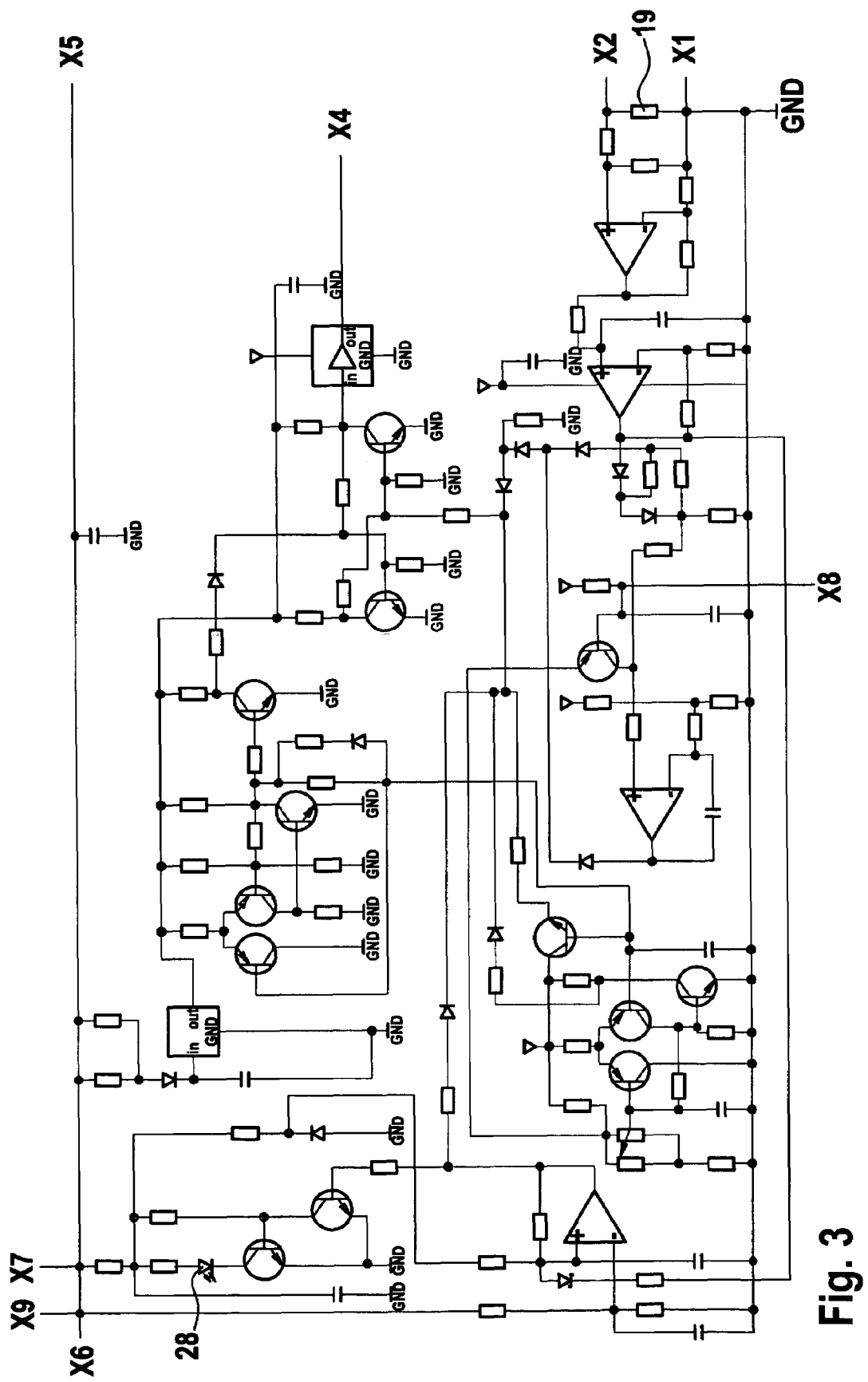
FIG. 3 shows an example of an overall schematic diagram of a preferred electronic unit in accordance with the present invention.

FIG. 1 shows a schematic diagram of a preferred power tool. An electronic unit 15 controls gate impulses of a MOSFET 17 acting as a switch, which supplies operating voltage from an energy accumulator 12 to a switch 11 and, therefore, a drive motor 10. FIG. 3 shows, as an example, an overall schematic diagram of electronic unit 15. The interplay of individual functional blocks of the method according to the present invention is depicted in FIG. 2.

Switch 11 switches the direction of rotation of drive motor 10 between right and left rotation as desired. In a freewheeling phase, the motor current flows through a freewheeling diode 18. Gate X4 of MOSFET 17 can be applied to switch 11. A measuring resistor 19 is connected between source X2 of MOSFET 17 and negative terminal X1 of energy accumulator 12, as shown in FIG. 3, with which an electrical current flow from energy accumulator 12 is measured.

A temperature of energy accumulator 12 is determined using a sensor 16 and transmitted to temperature input X8. A capacitor 14 is located parallel to energy accumulator 12. An on-off switch 13 turns the supply voltage to drive motor 10 and, via input X5, to electronic unit 15 on or off.

These functional blocks protect the energy accumulator, which is preferably designed as a lithium ion battery, and provide the power tool with good regulating properties.

The electronic unit 15 generates, in voltage block 20, a clock frequency of a few kHz, preferably between 7 and 10 kHz, and particularly preferably 8 kHz. At the beginning of each cycle, a gate voltage in gate voltage block 21 is applied to input S, which therefore turns on MOSFET 17. MOSFET 17 can be turned off via resetting at input R during a cycle using various signals.

The electric current from energy accumulator 12 flows through measuring resistor 19 and generates a current-proportional signal, which is amplified. When a maximum value is reached, in particular a maximum permissible discharge current of energy accumulator 12, e.g., approx. 30 A when a lithium ion battery is used, the gate voltage in gate voltage block 21 is reset. As a result, the power tool merely reduces its pulse width, but does not shut off completely. The motor current and, therefore, the torque remain at a maximum level, and only the rotational speed decreases.

Current-proportional signal I is determined in current measurement block 23 and subsequently converted in integration block 24 to a signal $I_{eff}$, which is proportional to the square of the current. A limit $I_{grenz}$ is subtracted from this new signal $I_{eff}$. This difference $I_{eff}-I_{grenz}$ is integrated with respect to time. Signal $I_{eff}$ is proportional to the ohmic losses ($I^2 \cdot R$) in energy accumulator 12 and drive motor 10. That is, the power loss above the permissible losses is integrated. When this integral reaches a limit, the gate voltage in gate voltage block 21 is reset. This does not cause the power tool to shut off, either. It only reduces the rotational speed.

Voltage $U_{bat}$ of energy accumulator 12 is monitored continually in functional block 25, to protect lithium ion batteries against total discharge. Lithium ion batteries are highly susceptible to total discharge. If the actual value falls below limit $U_{batt,min}$, which is adjusted as a function of load (I·R compensation), electronic unit 15 turns off gate X4, i.e., the gate voltage is rest in gate voltage block 21. To perform I·R compensation, functional block 25 receives a signal from current measurement block 23. This initially results in a reduced rotational speed. If energy accumulator 12 is discharged, the power tool shuts off completely. In this case, drilling-site illumination 28 in functional block 26 is switched off.

When energy accumulator 12 is designed as a lithium ion battery, as is known, e.g., with nickel-based cells, it must be protected against excessive temperatures. The temperature in energy accumulator 12 is determined (functional block 27) using a temperature resistor 16—preferably a NTC resistor—which is preferably integrated in energy accumulator 12. If a specified limit is exceeded, electronic unit 15 adulterates the current signals in functional block 24 such that the power tool is shut off gently and not abruptly.

Finally, the pulse width of the gate voltage can be adjusted using a potentiometer in on-off switch 13 (pulse-width block 22). Using a logarithmic dependence between a displacement path of the potentiometer and the pulse width, the rotational speed of the power tool can be adjusted very precisely between 0 and 100%.

Particularly preferably, the power tool is a cordless screwdriver with a lithium ion battery.

It will be understood that each of the elements described above, or two or more together, may also find a useful application in other types of constructions differing from the types described above.

While the invention has been illustrated and described as embodied in a method for operating a power tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of operating a power tool with an energy accumulator which supplies power to an electric drive motor, comprising the steps of generating a clock frequency by an electronic unit; with the generated clock frequency; switching on a gate of a MOSFET which supplies operating voltage to the drive motor; carrying out the switching on of the gate of the MOSFET during a cycle of each pulse of the clock frequency; sensing an electric current from the energy accumulator; sensing a power loss of an element selected from the group consisting of the energy accumulator, the drive motor, and both; sensing a temperature of the energy accumulator; sensing an electric voltage of the energy accumulator; switching off the MOSFET during the cycle of each pulse of the clock frequency by any of a number of signals depending on different operating parameters which include a maximum permissible electric current, a maximum permissible power loss of the element selected from the group consisting of the energy accumulator, the drive motor, and both, a maximum permissible temperature of the energy accumulator, and a minimum permissible electric voltage.

2. A method as defined in claim 1; and further comprising reducing a pulse width of triggering signals of the drive motor, when a specified threshold value of an operating parameter of the power tool is reached.

3. A method as defined in claim 1; and further comprising determining a signal that is proportional to a parameter selected from the group consisting of ohmic losses in the energy accumulator, ohmic losses in the drive motor, and both; an integrating a power loss that is above permissible losses.

4. A method as defined in claim 3; and further comprising obtaining a current from the energy accumulator from a current-proportional signal; converting the current to a signal that is proportional to a square of the current; calculating a difference between a current value and a threshold; and integrating the difference with respect to time.

5. A method as defined in claim 1; and further comprising switching off the drive motor completely when the energy accumulator is discharged.

6. A method as defined in claim 1; and further comprising not switching off drilling-site illumination until the drive motor is shut off completely.

7. A method as defined in claim 1; and further comprising using as the energy accumulator a rechargeable energy accumulator.

8. A power tool, comprising an electric drive motor; an energy accumulator which supplies power to said electric drive motor; an electronic unit for generating a clock frequency which is applied to a gate of a MOSFET which applies an operating voltage to said drive motor for said MOSFET to be switched on during a cycle of each pulse of said clock frequency; means for sensing an electric current from said energy accumulator; means for sensing a power loss of an element selected from the group consisting of said energy accumulator, said drive motor, and both; means for sensing a temperature of said energy accumulator; means for sensing an electric voltage of said energy accumulator, wherein with said MOSFET being switchable off during the cycle of each pulse of said clock frequency by any of a number of different signals depending on different operating parameters which include a maximum permissible electric current, a maximum permissible power loss of an element selected from the group consisting of said energy accumulator, said drive motor, and both, a maximum permissible temperature of said energy accumulator, and a minimum permissible electric voltage.

9. A method of operating a power tool with an energy accumulator which supplies power to an electric drive motor, comprising the steps of generating a drive signal by an electronic unit; with the generated drive signal, switching on a gate of an electronic switching device which supplies operating voltage to the drive motor; carrying out the switching on of the gate of the electronic switching device during a cycle of each pulse of the drive signal; sensing an electric current from the energy accumulator; sensing a power loss of an element selected from the group consisting of the energy accumulator, the drive motor, and both; sensing a temperature of the energy accumulator; sensing an electric voltage of the energy accumulator; switching off the electronic switching device during the cycle of each pulse of the drive signal by any of a number of signals depending on different operating parameters which include a maximum permissible electric current, a maximum permissible power loss of the element selected from the group consisting of the energy accumulator, the drive motor, and both, a maximum permissible temperature of the energy accumulator, and a minimum permissible electric voltage.

10. A power tool, comprising an electric drive motor; an energy accumulator which supplies power to said electric drive motor; an electronic unit for generating a drive signal which is applied to a gate of an electronic switching device which applies an operating voltage to said drive motor for said electronic switching device to be switched on during a cycle of each pulse of said drive signal; means for sensing an electric current from said energy accumulator; means for sensing a power loss of an element selected from the group consisting of said energy accumulator, said drive motor, and both; means for sensing a temperature of said energy accumulator; means for sensing an electric voltage of said energy accumulator, wherein said electronic switching device being switchable off during the cycle of each pulse of said drive signal by any of a number of different signals depending on different operating parameters which include a maximum permissible electric current, a maximum permissible power loss of the element selected from the group consisting of said energy accumulator, said drive motor, and both, a maximum permissible temperature of said energy accumulator, and a minimum permissible electric voltage.

* * * * *